United States Patent [19]

McCarthy

[11] Patent Number: 4,620,240

[45] Date of Patent: Oct. 28, 1986

[54] WIDE BAND TAPE RECORDER INTERFACE FOR RECORDING DIGITAL IMAGE DATA IN REAL TIME

[75] Inventor: Clifton J. McCarthy, Pinehurst, Mass.

[73] Assignee: Itek Corporation, Lexington, Mass.

[21] Appl. No.: 568,024

[22] Filed: Jan. 4, 1984

[51] Int. Cl.[4] ............................................. G11B 5/09
[52] U.S. Cl. ......................................... 360/48; 360/39
[58] Field of Search ........................... 360/48, 36.2, 39

[56] References Cited

U.S. PATENT DOCUMENTS

| 4,001,883 | 1/1977 | Strout et al. | 360/48 |
| 4,389,681 | 6/1983 | Tanaka et al. | 360/48 |
| 4,530,048 | 7/1985 | Peoper | 360/32 |

Primary Examiner—Vincent P. Canney
Attorney, Agent, or Firm—Michael H. Wallach; Robert F. Rotella

[57] ABSTRACT

Incoming data from one of two data channels is coupled through a multiplexer to a ping pong memory. While data is being read into one section of the ping pong memory from the data processing equipment, it is being read out of the other side of the ping pong memory. Since part of the header information constitutes marks and spaces, i.e., groupings of all ones or all zeros, if a data word contains all ones, it could be misconstrued. Therefore, any data word which contains all ones is converted to a data word which is one bit less than all ones. Once this conditioning is done, of each group of 13 input words, each word representing a pixel and each word being ten bits long, the first, fifth, and ninth words are extracted using programmable logic arrays. The 30 bits obtained by this extraction are broken down and appended, in groups of three, to the existing bits of the remaining ten words of each group of 13 input words. This then results in ten 13-bit words and achieves optimum packing utilizing all 13 channels on the tape.

10 Claims, 4 Drawing Figures

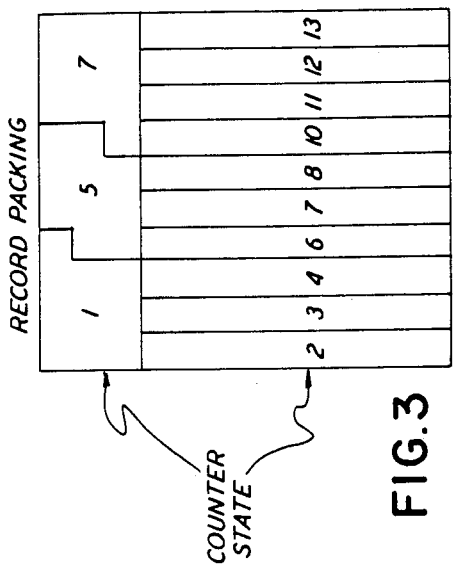
FIG. 3
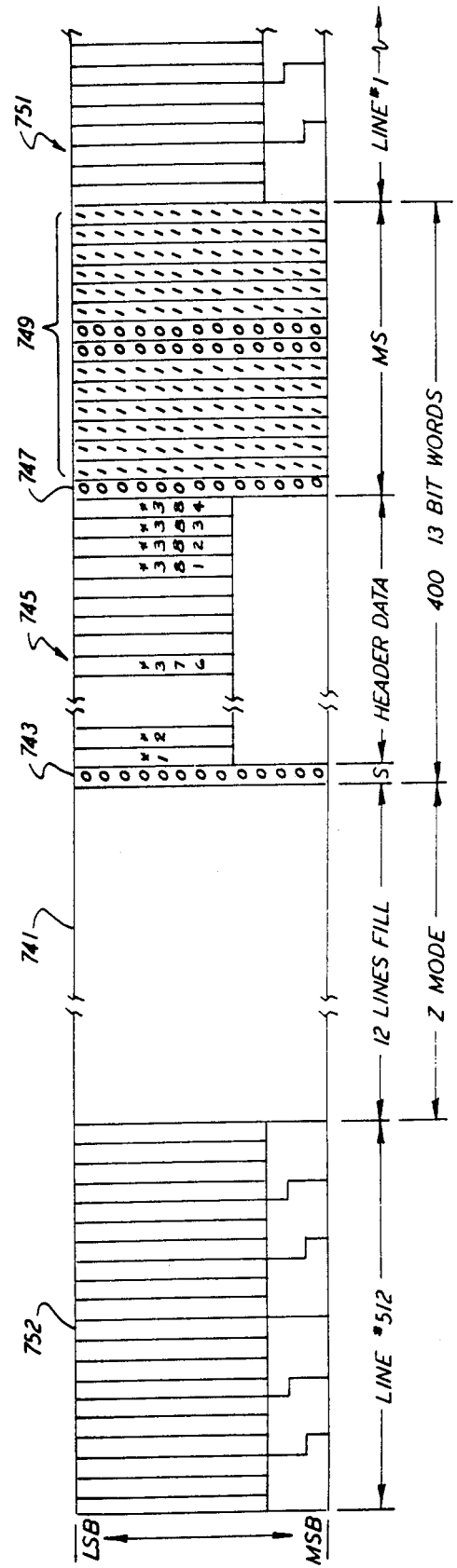
FIG. 2
FIG. 4

WIDE BAND TAPE RECORDER INTERFACE FOR RECORDING DIGITAL IMAGE DATA IN REAL TIME

BACKGROUND OF THE INVENTION

This invention relates to digital data processing in general and more particularly to an improved interface for interfacing a digital image processing system with a wide-band recorder.

Wide-band tape recorders which can record data at relatively high rates are known. A typical example of such a tape recorder is the Honeywell model HD-96. This invention uses the less expensive fourteen channel version of this tape recorder with one channel dedicated to error detection and correction with data recorded on the other thirteen channels. Of course, other appropriate tape recorders can be used. As with any tape recorder, the recorder only records which is supplied to it.

In digital image processing, for example in the type of digital image processing carried out for diagnostic purposes and disclosed in co-pending application Ser. No. 568,013 entitled "Realtime Digital Diagnostic Image Processing Systems" filed on even date herewith and assigned to the same assignee as the present invention, there is a need to record the digital image information generated at 30 frames per second and header information, and identifying mark and space information in order to be able to separate frames. This header information is also needed in order to identify the conditions under which the image was made and the patient of whom it is an image. In addition, the ability to search for and find a particular image should be provided. Furthermore, packing of the information on to the tape so as to utilize all thirteen channels, for example, in order to get the maximum amount of information on the tape along with the possibility of varying tape speed is desired.

SUMMARY OF THE INVENTION

The present invention provides a solution to this problem. Incoming data from one of two data channels is coupled through a multiplexer to a ping pong memory. While data is being read into one section of the ping pong memory from the data processing equipment, it is being read out of the other side of the ping pong memory. The ping pong memory sections, in conventional fashion, alternate. Since part of the header information constitutes marks and spaces, i.e., groupings of all ones or all zeros, if a data word contains all ones it could be misconstrued. Therefore, any data word which contains all ones is converted to a data word which is one bit less than all ones. Once this conditioning is done, of each group of thirteen input words, each word representing a pixel and each word being ten bits long, the first, fifth and ninth words are extracted using programable logic array. The thirty bits obtained by this extraction are broken down and appended, in groups of three, to the existing bits of the remaining ten words of each group of thirteen input words. This then results in ten thirteen bit words and achieves optimum packing utilizing all thirteen channels on the tape.

The resulting thirteen bit words are coupled through a multiplexer also having header input and mark and space input to a first out (FIFO) memory. The system operates basically at an 8.33 MHz clock rate. However, because of the ten to thirteen packing, it then becomes possible to slow down the output data rate to the tape recorder itself to 6.4 MHz which is 10/13 of 8.33 MHz. Thus, information is read into the FIFO memory in bursts at 8.33 MHz and read out continuously at a 6.4 1 MHz maximum rate. The 6.4 MHz clock is obtained by utilizing a phase locked loop with a programmable output. Inputs from an external source indicate the desired frame rate, the 6.4 MHz rate representing thirty frames per second. The system has the capability of providing other frame rates down to one frame per second. This then is rhe rate at which frames are read into or out of the FIFO memory.

The format of the information put on the tape consists of a variable number of words of all ones (in this example a count of 3200 is used) followed by one word of all zeros, followed by the header identifying data, followed by a pattern of marks and spaces. The header data starts with the all zeros word after the 3200 words of all ones and consists of 400 13 bit words. The pixel information, as noted above, is packed so that thirteen ten-bit pixels are formed into ten thirteen bit words recorded on the tape. Assuming an image made up of 512 by 512 pixels, each line of the display (i.e., each 512 pixels) will be contained in forty groups of ten record words or in 400 13 bit words bust as is the case with the header. Thus, the header has the same area on the tape as one line. Of course, the header will be followed by 512 lines. A programmed logic array is used to generate the mark and space pattern.

The header information is stored in a header memory under control of a microprocessor and at the appropriate time coupled through a multiplexer to the FIFO memory. This can be done at the recording rate of 6.4 MHz rather than at the system rate of 8.33 MHz since this is not image information and need not be handled at the image rate.

When playing the tape, the incoming data which is being read off the tape is in thirteen bit words. These words are converted back into ten bit words using the same programmable logic array (PAL) and another multiplexer. The multiplexer selects the ten least significant bits of each incoming thirteen bit word to generate output words two, three, four, six, seven, eight, ten, eleven, twelve, and thirteen of the output group of thirteen ten bit words. The three most significant bits of each incoming thirteen bit word are recombined to form words one, five, and nine of the output group of thirteen words. Words one, five and nine are selected by the multiplexer at the appropriate time to provide the correct sequence (one, two, three, four, five, etc.) to the ping pong memory from which they are read out to an output bus.

Also provided, is a header read memory in which is contained the header information of the frame of the video information currently being output by the tape recorder. The system provides capability of loading desired header information into a write memory and comparing what is being read out with what is desired and providing a signal when a match is obtained so that, under control of a host processor, the recorder and interface can be controlled to couple the desired frames of information to a system where they can be processed and/or displayed.

BRIEF DESCRIPTION OF THE DRAWINGS

FIG. 2 is a schematic representation of the manner in which data is recorded on the wide-band tape recorder.

FIG. 3 illustrates in more detail the packing of a group of thirteen pixels into then thirteen bit words.

FIG. 4 shows in more detail the manner in which 5 programmable logic array breaks up the first, fifth and ninth words to add them on to the ten bit words of the remaining ones of a group of thirteen.

DETAILED DESCRIPTION OF THE INVENTION

Figure 1:
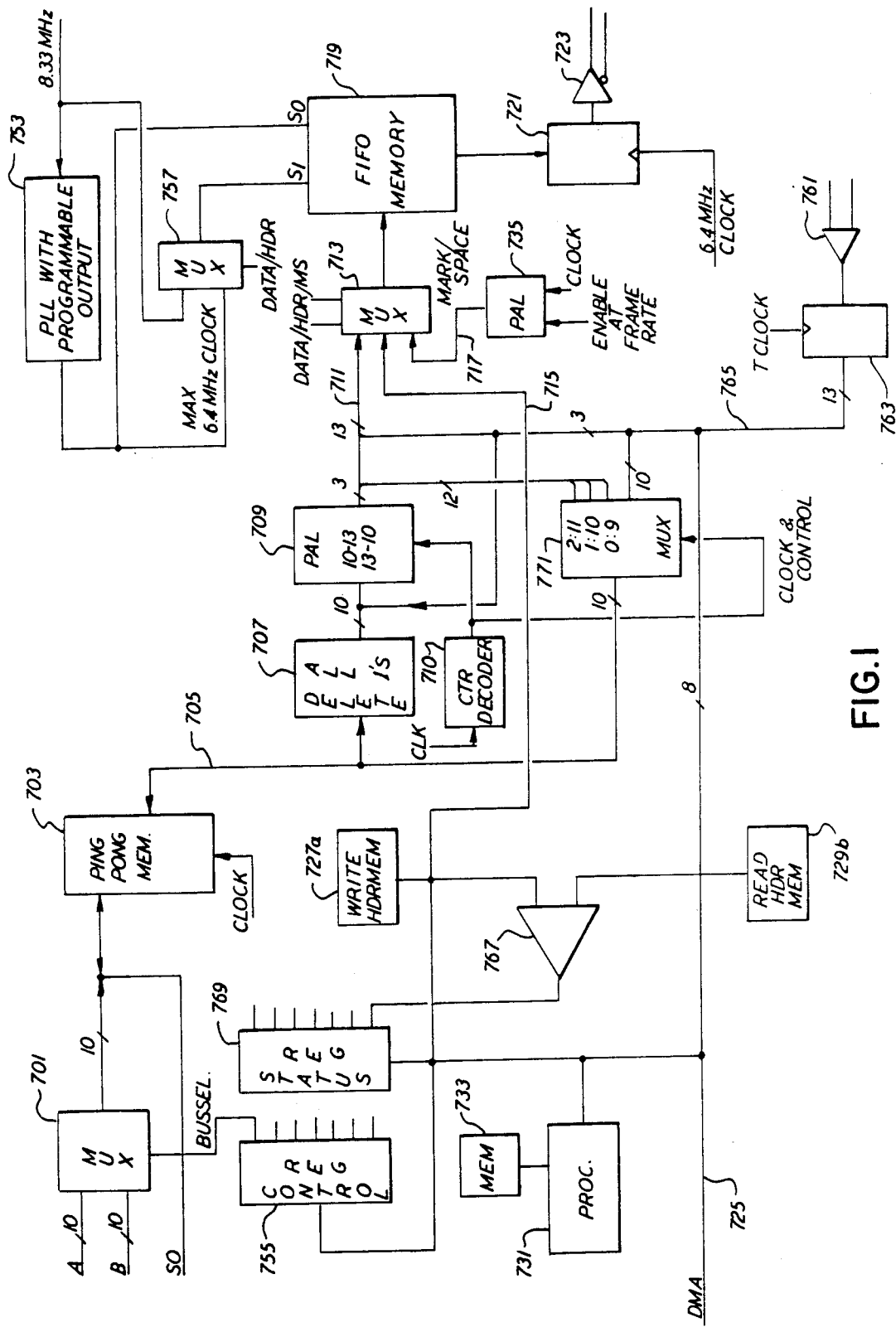
FIG. 1 is a block diagram of the wide-band tape recorder interface of the present invention.

The wide band tape recorder interface provides computer control over wide band tape recorder operations.

Function code definitions that apply for the wide band tape recorder interface and its device address are outlined below:

| DRV11B Function Codes(DMA) | Device Address |
|---|---|
| 0 — Undefined | 3 |
| 1 — Read WBTR Header RAM | |
| 2 — Undefined | |
| 3 — Write WBTR Header RAM | |
| 4 — Write Command | |

| DRV11B Function Codes(DMA) | Device Address |
|---|---|
| 5 — Read Status | |
| 6 — Write Configuration | |
| 7 — Board Select | |

Before any data is transferred to the wide band tape recorder interface it must be selected via the board select function with the appropriate device address.

Wide Band Tape Interface Command Word Format

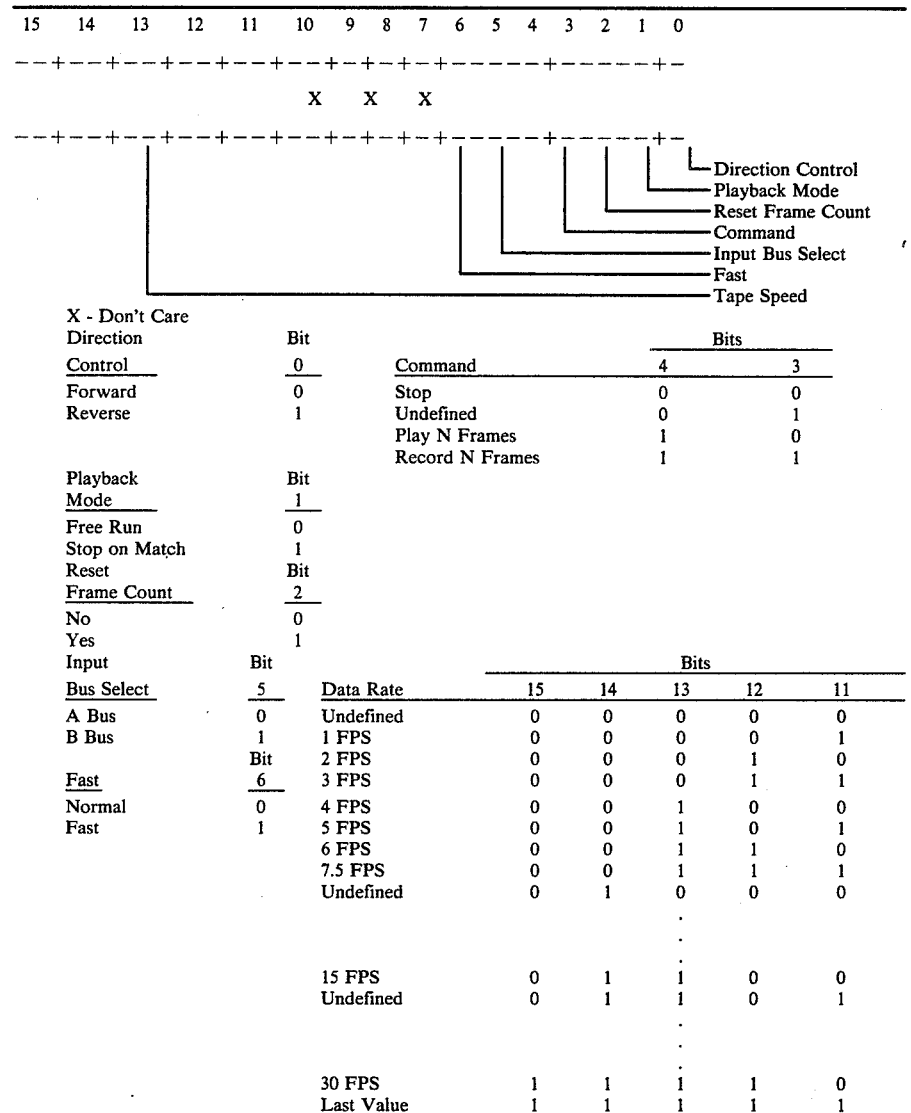

WBTR Interface Command Word Field Descriptions

Direction Control—Indicates direction of travel for commands that cause the wide band tape to move. Meaningful for record and playback commands.

Playback Mode—Meaningful for playback command only.

Free Run: For playback command the WBTR will playback the requested number of frames.

Stop On Match: WBTR will continue playback until a header data match occurs between RAM header and frame header on tape or the tape supply has been exhausted.

Reset Frame Court—Meaningful for record command only.
  No: Continue to increment frame count.
  Yes: Frame count reset for first frame.
Command—Controls movement of WBTR.
  Stop: Causes WBTR to come to a halt.
  Play N Frames: Requires a second command word. Causes WBTR to playback number of frames specified in the second command word; a value of 0 will cause the WBTR to playback until commanded to stop.
  Record N Frames: Requires a second command word. Causes WBTR to record number of frames specified in the second command word; a value of 0 will cause the WBTR to record until commanded to stop.
Input Bus Select—Meaningful for the record command only.
  A Bus: Input frame data comes from the A Bus.
  B Bus: Input frame data comes from the B Bus.
Fast—Meaningful for record and playback commands.
  Normal: tape speed field is used to select WBTR data rate.
  Fast: For high speed tape positioning only. Data can't be played back or recorded at this speed. Overrides tape speed field and number of frames to record or playback. The command field must be playback or record to start the WBTR.
Tape Speed—Select WBTR data rate for record or playback.

Wide Band Tape Interface Status Word Format

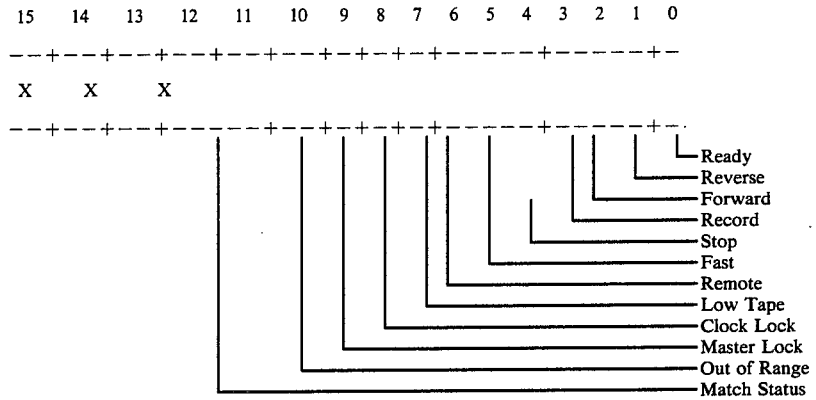

Bit 0 (Ready)—0: WBTR not ready to accept next command
  1: WBTR read to accept next command
Bit 1 (Reverse)—0: Tape is not moving in reverse direction
  1: Tape is moving in reverse direction
Bit 2 (Forward)—0: Tape is not moving in forward direction
  1: Tape is moving in forward direction
Bit 3 (Record)—0: Frame data is not being recorded on tape
  1: Frame data is being recorded on tape
Bit 4 (Stop)—0: WBTR is not stopped
  1: WBTR is stopped
Bit 5 (Fast)—0: WBTR is not operating at high speed
  1: WBTR is operating at high speed (no record/playback)
Bit 6 (Remote)—0: WBTR control is from console panel (local) 1: WBTR control is from the LS-11 interface
Bit 7 (Low Tape)—0: Tape supply is not low
  1: Tape supply is low (tape head is close to the end of the tape)
Bit 8 (Clock Lock)—0: Clock lock error has not been flagged
  1: Clock lock error has been flagged
Bit 9 (Master Lock)—0: Master lock error has not been flagged
  1: Master lock error has been flagged
Bit 10 (Out of Range)—0: No bad commands have been detected or flagged
  1: A bad command has been detected and flagged
Bits 11-12 (Match Status)—00: A match has been found between tape frame header and header RAM
  01: Header RAM frame count tape frame count but rest of header data matches
  10: Header RAM frame count tape frame count but rest of header data matches
  11: No comparison (no match found)
"X" denotes an unused bit Wide Band Tape Header RAM Description The wide band tape header RAM performs three functions. First it is used to record header data received from a host computer along with frame data. Secondly it is used to make the frame header data available to a host computer during playback. Lastly it is used for comparing a 16 byte subset of header data including frame count obtained from the LSI-11 with frame headers on wide band tape during "stop on match" mode playback. When a match is detected the WBTR stops. In both modes of playback the header RAM contains the header data for the current frame.

Transferring Header RAM Data To/From The LSI-11

Transfer of header RAM data to/from the LSI-11 is accomplished by initiating a DMA read/write of 194 words with the read/write header data function code (make sure WBTR device address has been selected). Formats for DMA data for read/write of WBTR header RAM are described in detail below:

| | Data Formats | |
|---|---|---|
| | Read Header Data | Write Header Data |
| Words | Description | Description |
| 1 | Length of data | Length of data transferred |

-continued

| | Data Formats | |
|---|---|---|
| | Read Header Data | Write Header Data |
| Words | Description | Description |
| | transferred in bytes should be (388) | in bytes should be (388) |
| 2 | Frame count | Compare mask |
| 3-10 | Match header data | Match header data |
| 11-194 | Optional header data | Optional header data |

Notes:
(1) — Bytes 15-16 of match header data area are reserved for frame count compare and must be used when comparing frame count.
(2) — Compare mask format:
Bit 0 — 0: Don't compare 1st byte of match data.
1: Compare 1st byte of match data.

.
.
.

Bit 15 — 0: Don't compare 16th byte of match data.
1: Compare 16th byte of match data.
(3) — When writing header RAM for any purpose

Wide Band Tape Recorder Interface

FIG. 1 is a block diagram of the wide band tape recorder interface which responds to the controls just described. Incoming data to be recorded, i.e. 10 bit words, each representing a pixel, on either bus A or B is coupled into a multiplexer 701. The output of the multiplexer, which is also a 10-bit word, is coupled to a ping-pong memory 703. The ping-pong memory, in conventional fashion has two sections. While data is being read into one section, data is read out of the other. Data read out on line 705 is coupled through a logic circuit 707 which converts any all ones data word into a different data word by substracting one from it. This is necessary since a mark used as identifying information in the system contains all ones.

The tape recorder contains thirteen channels. It, thus, becomes necessary, if one is to get dense packing, to convert the ten bit word into a 13-bit word format. This is done utilizing a programmable logic array (PAL) 709 and treating the input words in groups of 13. The PAL breaks up certain of the words into 3-bit segments which are then appended to the remaining words to achieve a 13-bit signal on line 711. Line 711 is one input to a multiplexer 713. Multiplexer 713 has as its other inputs a header input on line 715 and a mark/space input on line 717. The manner in which these are generated will be described below.

The output is coupled from multiplexer 713 into a first in, first out (FIFO) memory 719, the output of which, after being clocked through a flip-flop array 721 and a driver 723 for impedance matching forms the final output to the tape recorder. Although only a single differential output is shown here, it will be recognized that there are thirteen such outputs, one for each channel.

As indicated above, header information is provided from the host computer over the DMA bus 725. Coupled to this bus is the header memory which includes a write header memory section 727a and a read header memory section 729b. Also coupled to the DMA bus is a processor 731 with its program memory 733. In conventional fashion, in the manner described above, processor 731 formats the header information and develops certain control signals for use in the system in accordance with information stored in a control register 755 and in its memory 733. The header information to be written will be stored in memory 727a, and is provided as an input to multiplexer 713 under control of the processor 731. Mark and space information is generated by a programmable logical array (PAL) 735 having clock and enable inputs. A control input from the processor 731 will enable the array 735 to produce the mark and spaces when necessary. This occurs at the frame rate, one each frame for approximately one line time.

FIG. 2 shows the arrangement of data on the tape. Shown is a section 741 composed of a variable number of words of all ones called marks. This is collowed by a word 743 of all zeros called a space. Thereafter follows the header data supplied from the header memory 727a, this being designated as section 745. This in turn is followed by another word of zeros 747 followed by a pattern of marks and spaces 749. At the end of this pattern is the first line of data 751. The header information takes up 400 13 bit words which is the equivalent of one line of digitized video data words. The 10 least significant bits of recorded data, as can be seen in more detail from FIG. 3, is made up of all the bits from the words 2, 3, 4, 6, 7, 8, 10, 11, 12 and 13 of a group of 13 input words and 10 bit wide words. The three most significant bits of recorded data are obtained by breaking up the input words 1, 5 and 9. FIG. 4 shows in detail, how the ten bits of each of these words is broken up and added onto the ten less significant bits. After thirteen input words are used to form 10 recorded words, the process repeats. Of course, each input word represents a pixel. Ezch line is 512 pixels and thus requires 40 groups of ten thirteen bit words or 400 words. After 512 video lines, the 512th line 752 shown at the left of FIG. 2, (512×400) words on the tape, the process repeats. This process is under the control of a counter/decoder 710 on FIG. 1 which provides control inputs to PAL 709. Counter/decoder 710, in addition to including a 13 bit counter, also counts lines and frames.

The tape recorder should receive data at a constant rate which at a maximum corresponds to thirty frames per second. Information is read into the memory 719 at the system clock frequency at 8/33 MHz. Because of the 10 bits to 13 bits data compression it is read out at 6.4 MHz rate at the maximum. The 6.4 MHz clock is developed in a phase-locked loop with a programmable output. The phase-locked loop receives its instruction as to the frame rate, or its division ration, from the control register 755 which is also connected to the DMA bus. The various signals into the control register are described above. An example of one of the signals is the bus select which couples into multiplexer 701. Thus, a maximum 6.4 MHz clock signals provides the output clock for memory FIFO 719. It is also one input to a multiplexer 757 providing the input clock for FIFO memory 719. A second input to the multiplexer 757 is the 8.33 MHz clock. Normally, when data is being transferred into the FIFO memory it is transferred in at the 8.33 MHz rate. However, header and mark and space information is transferred in at the lower rate and thus, the multiplexer is provided for this purpose.

When playing back into the interface, the signal from the tape recorder is coupled through a buffer amplifier 761 and flip-flops 763, controlled by the tape clock, to provide a 13-bit output on bus 765. The eight least significant bits are provided to header memory 729b to permit comparison with a desired header that is being searched for, contained in write header memory 727a. If a comparison or match is detected by comparator 767, this signal is provided to a status register 769, which has additional inputs from the tape recorder, as indicated above, describing this status word, and this may be used by the host processor and local processor 731 to carry out further control of the tape. The incoming signal is also coupled into a combining circuit 771 and to the PAL 709. The three most significant bits go into the PAL 709 where they are recombined back into words. A multiplexer 771 receives as inputs the ten least significant bits from each of the incoming 13 bit data words along with the outputs from the PAL which is on a 12-bit bus with only ten bits connected into each of the three inputs, of the multiplexer 771 in the manner indicated. In accordance with FIGS. 3 and 4, the multiplexer is controlled by counter/decoder 710 to select in sequence each of the proper words which are then transferred to the ping-pong memory 703 from which they are coupled onto the output bus SO.

What is claimed is:

1. Apparatus for interfacing a wide-band tape recorder having M channels in parallel with a digital image processing system, processing frames of digital information made up of arrays of pixels, each pixel represented by an N bit digital word with the digital words representative of the pixels available on an N bit parallel bus in which each line of the array is presented in serial order from top to the bottom of the frame comprising:
   (a) a memory for storing desired header information which is to be provided with each frame of information;
   (b) means to buffer incoming N bit words from the bus;
   (c) means for converting said N bit words into M bit words, said means for converting having said N bit words from said means to buffer as inputs and providing an M bit parallel output; and
   (d) output means having as inputs the M bit parallel output of said means for converting, and having an M bit parallel output coupled as the input to said wide-band tape recorder, said output means adapted to insert the header information contained in said memory at the beginning of each frame of information which is transferred to said tape recorder.

2. Apparatus according to claim 1 wherein said pixels are represented by ten bit words and said recorder has thirteen channels and said means for converting include a programmable logic array adapted to break the first, fifth and ninth words of a group of thirteen words down into groups of three bits and to provide said bits as outputs to be added to the remaining words of the group of thirteen in succession.

3. Apparatus according to claim 1 and further including a microprocessor and associated memory for controlling and formating said header memory.

4. Apparatus according to claim 3 and further including means to generate marks and spaces with each header.

5. Apparatus according to claim 4 wherein said means to generate include a programmable logic array.

6. Apparatus according to claim 1 and further including means to convert the data rate of data flowing through said apparatus comprising a FIFO memory receiving input data at a first rate and providing an output at a rate which is equal to N over M of said input rate.

7. Apparatus according to claim 6 and further including means for generating said output rate comprising a phase-locked loop having as an input said input rate and dividing said input rate by said ratio of N over M to provide said output rate.

8. Apparatus according to claim 7 wherein said phase locked loop is programmable whereby different output rates and thereby different frame rates at which data is recorded on said wide-band tape recorder may be established.

9. Apparatus according to claim 1 and further including means for converting M bit words received from said tape recorder into N bit words.

10. Apparatus according to claim 1 or 9 and further including means for comparing a header read from said tape with a desired header and providing an output indicative of a match.

* * * * *